INVENTORS:
ZBIGNIEW J. JANIA
LAWRENCE J. VANDERBERG
ATTORNEYS.

$$VOLTAGE = -\left(\frac{R_f}{R_v}V_o + \frac{R_f}{R_a}\ell_o\right)$$

INVENTORS:
ZBIGNIEW J. JANIA
LAWRENCE J. VANDERBERG
BY: *[signatures]*
ATTORNEYS.

INTEGRATER

United States Patent Office 3,671,081
Patented June 20, 1972

3,671,081
ELECTRONIC CONTROL SYSTEM FOR ANTISKID VEHICLE BRAKES
Zbigniew J. Jania, Northville, and Lawrence J. Vanderberg, Ann Arbor, Mich., assignors to Ford Motor Company, Dearborn, Mich.
Filed Jan. 15, 1970, Ser. No. 3,122
Int. Cl. B60t 8/08
U.S. Cl. 303—21 BE                                          12 Claims

ABSTRACT OF THE DISCLOSURE

An antiskid brake system for wheeled vehicles comprising a brake pressure modulator for the vehicle wheel brakes which responds to wheel slip at the wheel road interface, the wheel slip being determined by a slip detecting system comprising two independent control signal sources, one signal being proportional to vehicle wheel speed and the other being a synthesized vehicle velocity signal resulting from integration of a deceleration signal, and a fast acting feedback system that induces a correction in anticipation of the control system response at the wheel brakes, thereby avoiding an instantaneous periodic locking of the brake system during the vehicle braking mode of operation as incipient skidding occurs.

GENERAL DESCRIPTION OF THE INVENTION

Prior art antiskid control systems for wheeled vehicle brakes include brake pressure compensating control valves that are triggered by input variable or signals determined, for example, by vehicle deceleration and vehicle wheel speed. The control system responds to changes in these input variables by reducing brake pressure. This is done by means of an expansible accumulator or other fluid pressure actuator which enlarges the volume of the total space occupied by the wheel brake fluid. An increase in that volume results in a decrease in brake pressure and a corresponding decrease in the vehicle wheel braking torque.

It is known practice also to cause such actuators to interrupt fluid communication between the vehicle brake master cylinder and the vehicle brake wheel cylinders when the input signals indicate to the control system that incipient wheel skidding is taking place. The wheel brake pressure in the actuator then falls immediately to zero or to some other minimum value, thereby relieving the braking torque on the wheel. This results in a tendency for the wheel to accelerate under the influence of the friction forces acting on the periphery of the wheel in the so-called contact patch between the wheel and the road service. As wheel acceleration takes place, a certain amount of vehicle braking occurs because of the inertia that is required to accelerate angularly the mass of the wheel to its former rotational velocity. But aside from this inertia effect, the wheel brakes are ineffective at that instant to provide vehicle braking action. Normal braking action is not restored until the wheel velocity again achieves a value that is compatible with the instantaneous vehicle velocity.

If the road surface is extremely slippery, the time required to reaccelerate the wheel could be prolonged unduly, thereby prolonging the transitory period during which the particular road wheel involved does not contribute to vehicle braking. As a result of this, the stopping distance on a slippery surface may be unduly prolonged. Furthermore, the momentary or periodic wheel skidding that occurs when instantaneous wheel braking is a maximum may increase vehicle yaw and cause difficulty in maintaining directional control during the braking mode.

In our improved antiskid brake system we have provided a fluid pressure actuator that modifies the magnitude of the wheel brake pressure distributed to the wheel brake cylinders, and the actuator responds to a control system that senses wheel slip. The signals that influence the operation of the control system, unlike the control signals in some prior art systems, are not deceleration signals determined by comparing preset values of the wheel velocity and the vehicle velocity.

Our improvement includes also a fast acting feedback circuit whereby the control system responds to the actuation of the fluid pressure actuator which in turn modifies the wheel brake cylinder pressure. The feedback allows the control system to anticipate the response of the actuator so that a correcting signal can be developed before the actuator will be allowed to complete that response. In this way the actuator will modify the wheel brake cylinder pressure, but in no instance will it reduce the brake pressure to its mimimum value during the vehicle wheel braking mode. The control system is calibrated so that a reduction in brake pressure will not fall below that value at which the optimum braking pressure for any given road condition is realized. Regardless of the coefficient of friction of the road surface, the optimum braking torque may be applied to the vehicle wheels with no periodic torque interruptions.

The actuator in our improved system responds with maximum possible speed, but it does not cause a wheel brake pressure variation within the extreme limits that are characteristic of certain prior art antiskid brake systems. The wheel braking torque is never reduced to a value that will prevent wheel rolling although it will permit a controlled degree of slipping to effect the maximum vehicle deceleration.

PARTICULAR DESCRIPTION OF THE INVENTION

Figure 1:
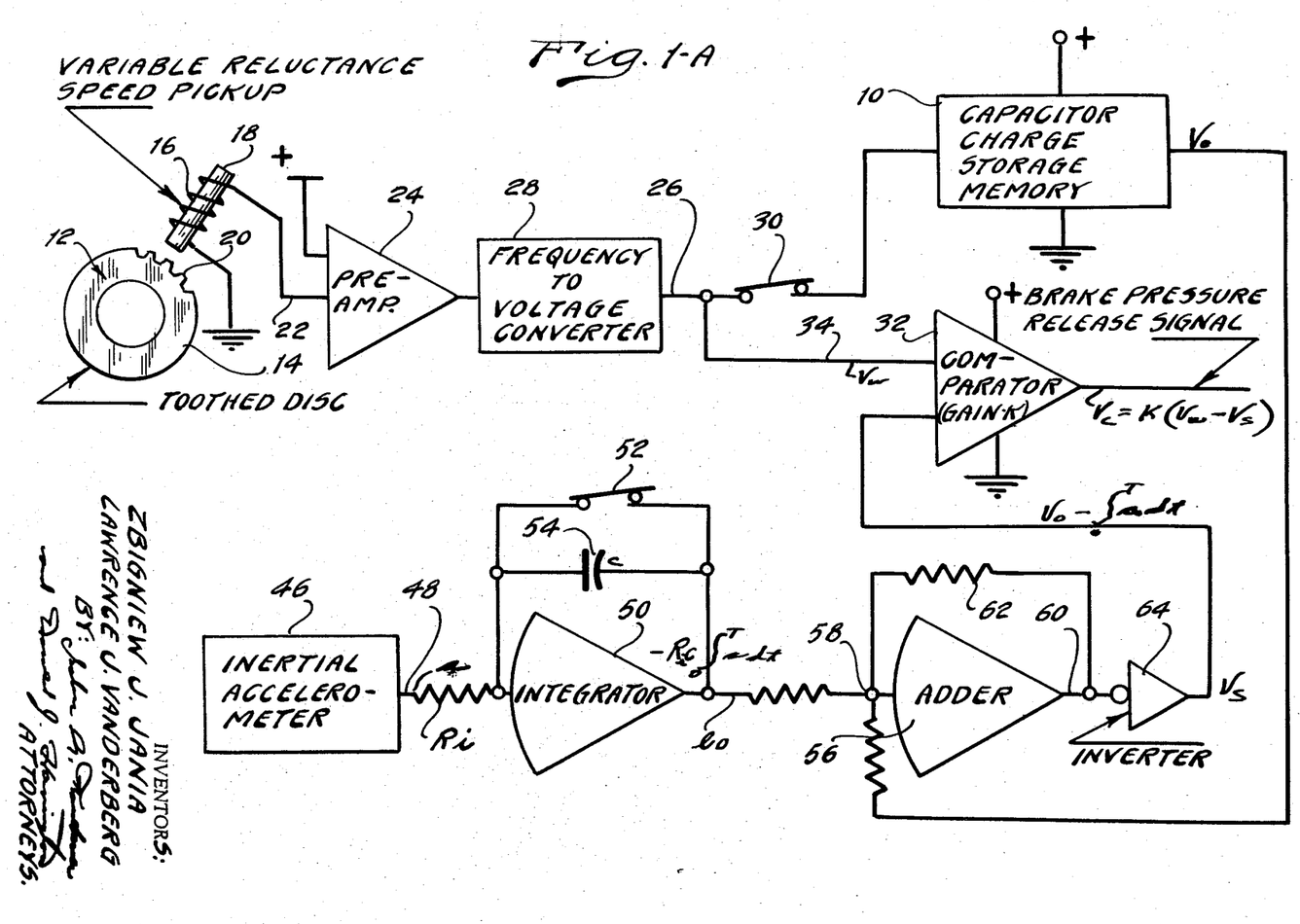
FIGS. 1A, 1B and 1C show in schematic form the control circuitry for effecting a modification of the wheel brake pressure in a vehicle wheel brake system during the brake operating mode.
Figure 1C:
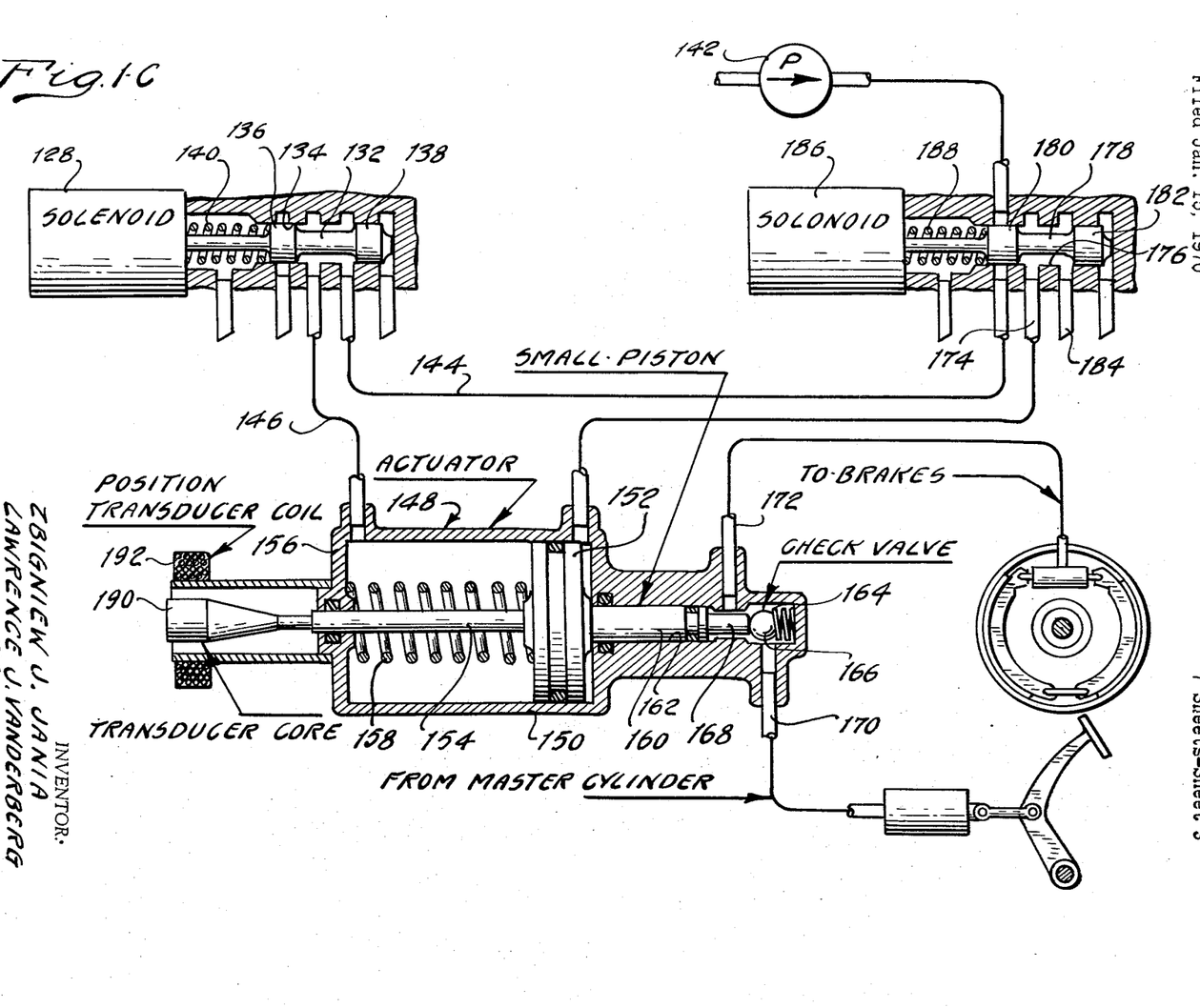

In the circuit of FIGS. 1A, 1B and 1C, numeral 10 shows in block diagram form a capacitor charged storage memory. The potential developed in the memory 10 is an indicator of wheel speed at any instant prior to actuation of the wheel brakes. The voltage signal developed results from an input signal that is proportional in magnitude to the wheel velocity. This signal is obtained from a variable reluctance speed pickup 12 which comprises a toothed disc 14 connected drivably to the vehicle driveshaft or connected drivably to one of the vehicle axle shafts. If the control system is used for preventing skidding of the rear wheels of the automotive vehicle, the toothed disc 14 can be connected to the driveshaft. If four-wheel control is desired, the toothed disc would be connected directly to the axle shaft for the controlled wheel, as will be explained subsequently.

An inductance coil 16 with a high impedance core 18 is arranged in proximity to the teeth 20 of the toothed disc. As the individual disc teeth move into and out of registry with the core 18, a variable or pulsating reluctance is established. This induces pulsating voltages in line 22 extending to preamplifier 24. A voltage signal $V_w$ is developed in signal line 26 by means of a frequency to voltage converter 28. The magnitude of the output voltage developed by the converter 28 is related directly in linear fashion to the frequency of the pulses in the line 22 as amplified by the preamplifier 24. The voltage signal $V_w$ is transmitted to the memory 10 through a normally closed switch 30.

This voltage $V_w$ is transmitted to a comparator 32 through signal line 34, which bypasses the memory 10.

Figure 8:
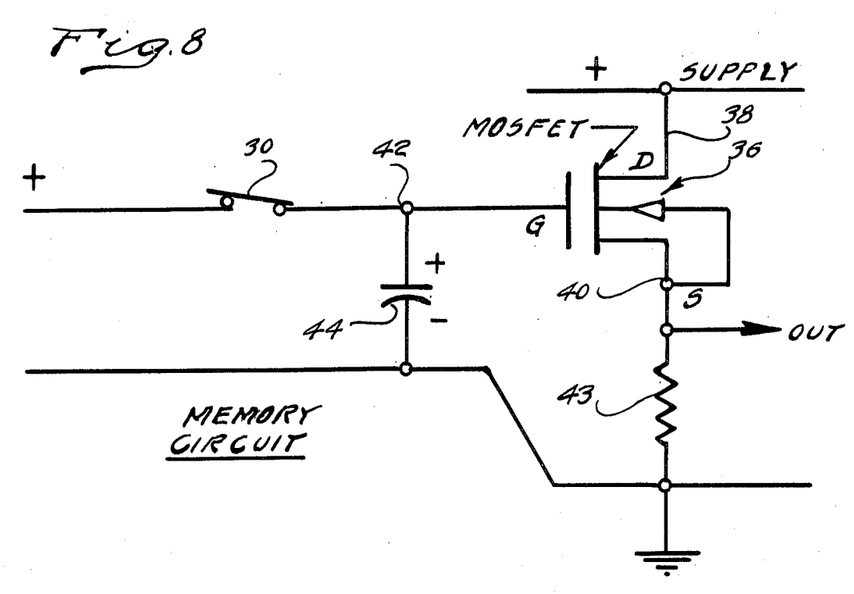
FIG. 8 shows in schematic form the capacitor storage memory used in the circuit of FIG. 1.

The memory 10 comprises a field effect transistor 36 having a drain connected to a suitable source of voltage and a sink 40 connected to one side of a resistor 43. The other side of the resistor is grounded. The transistor 36 is of a high impedance field effect type having a gate that is connected at 42 to one side of condenser 44, the opposite side of the condenser being connected to the output side of the resistor 43. The connection 42 receives the voltage signal $V_w$ through the switch 30 during normal operation of the vehicle prior to the application of the wheel brakes. At the instant the braking mode is initiated, switch 30 is opened thereby isolating the condenser 44. The charge on the condenser that exists immediately prior to application of the brakes is retained on the condenser during the braking mode. That charge, which is the gate voltage, induces a predetermined current flow through the sink terminal and through resistor 43. This induces a voltage drop across the resistor 43 which is indicated on the circuit diagram of FIG. 1 as voltage $V_0$.

During the braking mode, vehicle deceleration is sensed by an appropriate sensor indicated at 46 on the circuit diagram of FIGS. 1A, 1B and 1C. It produces an output signal voltage indicated at $a$ in line 48. This signal is distributed to an integrator 50 during the braking mode. The signal is bypassed around the integrator 50, however, through a normally closed switch 52 during normal operation of the vehicle prior to the braking mode. Capacitor 54 is arranged in series with respect to the switch 52.

Figure 7:
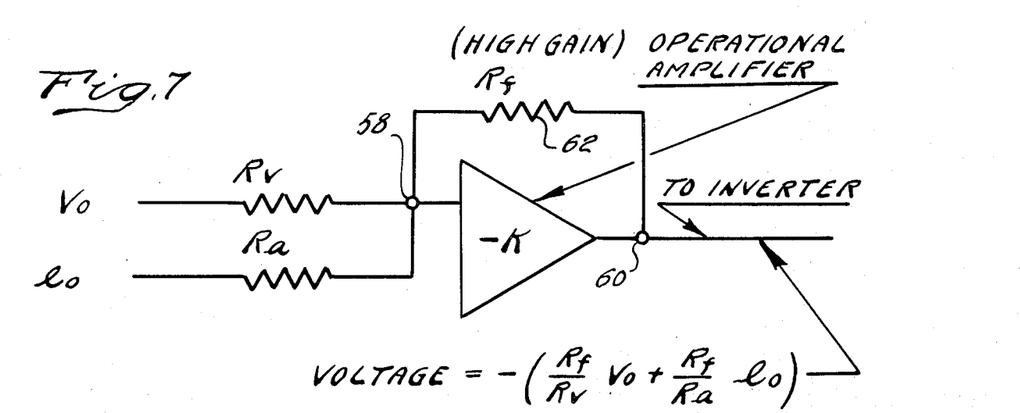
FIG. 7 shows in schematic form the adder used in the circuit of FIG. 1.
Figure 9:
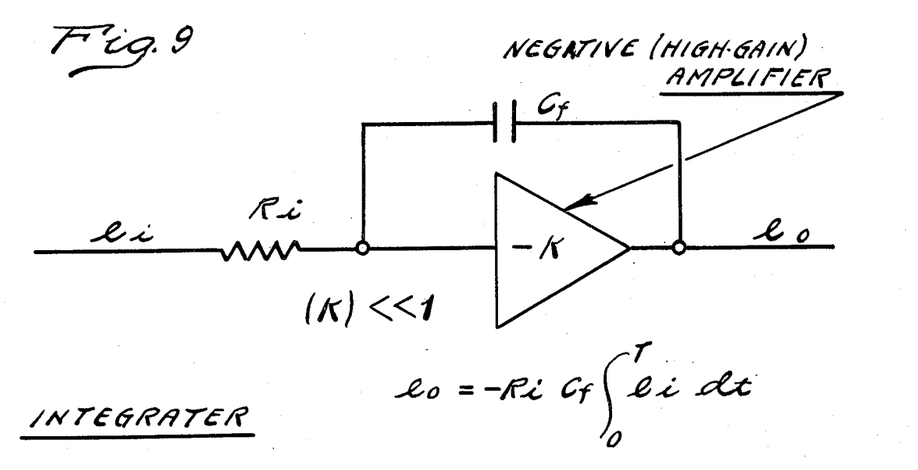
FIG. 9 shows in schematic form the integrator used in the circuit of FIG. 1.

In the integrator 50 is a negative, high gain amplifier that produces an output voltage $E_0$ which is of a sign that is opposite to the sign of the voltage A. The characteristics of the high gain amplifier 50 are such that the absolute value of the voltage $E_0$ is related linearly to the time interval that is characteristic of the condenser 54. The time is measured from a zero point corresponding to the instant the switch 52 is opened, which is opened simultaneously with the opening of the switch 30 upon application of the wheel brakes. The output voltage signal $E_0$ then is equal to $$-\int_{t=0}^{t=T} a\, dt$$

where T is determined by the characteristics of the condenser 54. The magnitude of the voltage $E_0$ thus is a synthesized speed signal since it represents the results of the integration of a signal that is a measure of acceleration. This integration of a second order function, namely, the vehicle deceleration, results in a first order function, namely, the vehicle velocity. The synthesized speed signal $E_0$ is distributed through resistor R to an adder 56. The memorized voltage $V_0$ which is an indicator of the vehicle speed at time equal 0, is distributed to point 58 on the input side of the adder.

The synthesized vehicle velocity indicated by $E_0$ is of a sign that is opposite to the sign of the voltage $V_0$, the memorized voltage. The adder 56 thus is effective to subtract the two voltages as it produces an output voltage $V_S$ in line 60.

The adder 56 is an amplifier arranged in parallel disposition with a controller resistance 62 in the normal fashion. The output voltage from the adder 56 then is equal to the algebraic sum of the input voltage $E_0$ times the ratio of the resistance R to the resistance R plus the input voltage $E_0$ times the ratio of the resistance R to the resistance R. Because of the negative gain characteristic of the integrator, it is necessary to employ a conventional inverter 64 to reverse polarity of the output voltage so that it can be used by the comparator 32.

Figure 6:
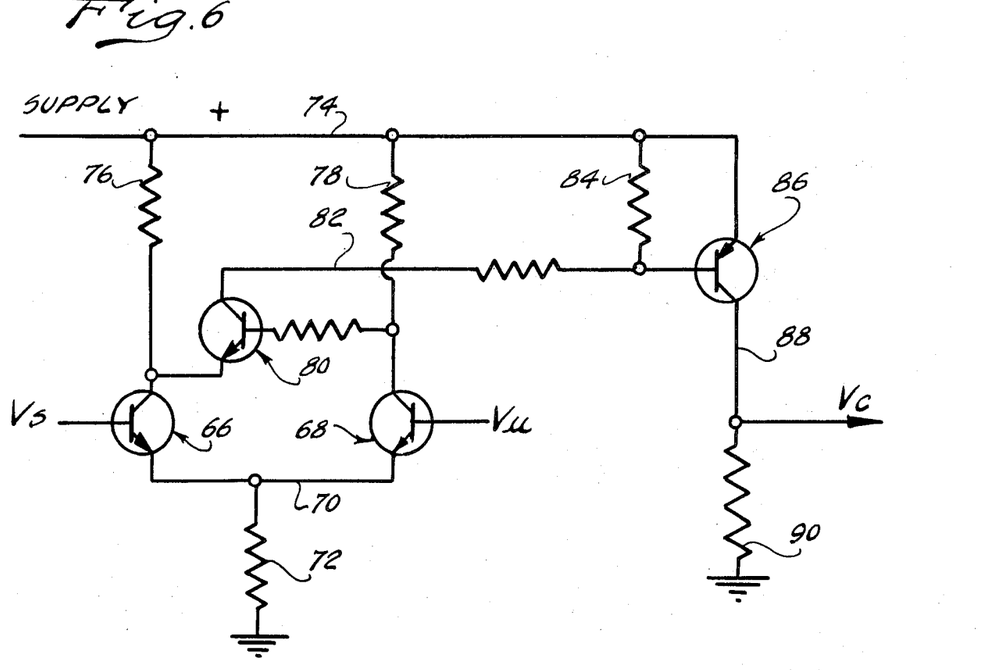
FIG. 6 shows in schematic form the elements of the comparator used in the circuit of FIG. 1.

The comparator 32 is a high gain amplifier. As indicated in FIG. 6, it receives signals from both the memory 10 and the inverter to produce a resultant signal $V_C$. If the vehicle wheels during the braking mode operate at a speed that is exactly consistent with the speed of the vehicle, the magnitude of the voltage $V_0$ will exactly equal the voltage $V_w$. The comparator then is balanced and the output voltage $V_C$ is zero.

The comparator comprises an NPN transistor 66 and the voltage $V_S$ is applied to the base of the transistor. A second NPN transistor 68 is arranged in opposing relationship with respect to the transistor 66, and its base is supplied with voltage $V_w$. The emitter of the transistor 66 and the emitter for transistor 68 meet at a common point 70 on the high potential side of resistor 72. The collector of the transistor 66 and the collector of the transistor 68 are connected to a common voltage supply line 74 through resistors 76 and 78, respectively.

Because of the voltage supply being made available to transistors 66 and 68, a collector current flows through each resistor 76 and 78 and is combined at point 70. Resistor 72 thus receives the balance of current flowing through each transistor, thereby inducing a voltage drop across it, which drop remains constant regardless of whether the input voltages become unbalanced.

The output terminal of the resistor 78 is connected to the base of a third transistor 80. The emitter for the transistor 80 is connected to the output terminal of the resistor 76 so that it is able to sense the collector voltage for transistor 66. As long as the balanced voltage state continues, the voltage drop across the resistors 76 and 78 will be constant, and thus the emitter voltage for the transistor 80 will be equal to the base voltage. Thus collector current will not be induced in the transistor 80.

When incipient skidding is sensed by the variable reluctance speed pick-up 12 and the inertial accelerometer 46, voltage $V_S$ tends to overbalance voltage $V_w$ for the reasons explained previously. This immediately unbalances the comparator. An increase in the voltage $V_S$ will result in an increased base-emitter voltage, thereby inducing a higher collector current through the resistor 76. The voltage drop across resistor 76 thus is greater than the voltage drop across resistor 78. This then produces a base-emitter bias across transistor 80 which induces a collector current flow through line 82.

Line 82 is connected to the supply line 74 through a resistor 84. As soon as collector current begins to flow in transistor 80, the resulting current flow in the resistor 84 will result in a potential drop across resistor 84. This potential drop is sensed by another transistor 86 of the PNP type. A base-emitter voltage thus is induced in transistor 86 which produces a collector current in line 88. This line serves as the input to a control resistor 90. The magnitude of the voltage drop across resistor 90 then is a measure of the voltage difference in the two input signals $V_S$ and $V_w$. This voltage drop across resistor 90 serves as the output voltage $V_C$, which is indicated in the chart of FIG. 1 on the output side of comparator 32.

Voltage $V_C$ serves as the input signal for the brake pressure release controls shown in FIG. 1B. The comparator, because of its high gain characteristic, is able to produce a useful signal at point 92. The circuit constants may be arranged, however, so that the control system will not trigger the operation of the actuator until the voltage at point 92 reaches a value that will correspond to a 5 m.p.h. wheel slip. This slip value may be varied depending upon the characteristics, but in any case there is some critical value at which optimum vehicle braking will be obtained. For purposes of this discussion, however, it will be assumed that this value is 5 m.p.h.

Figure 4:
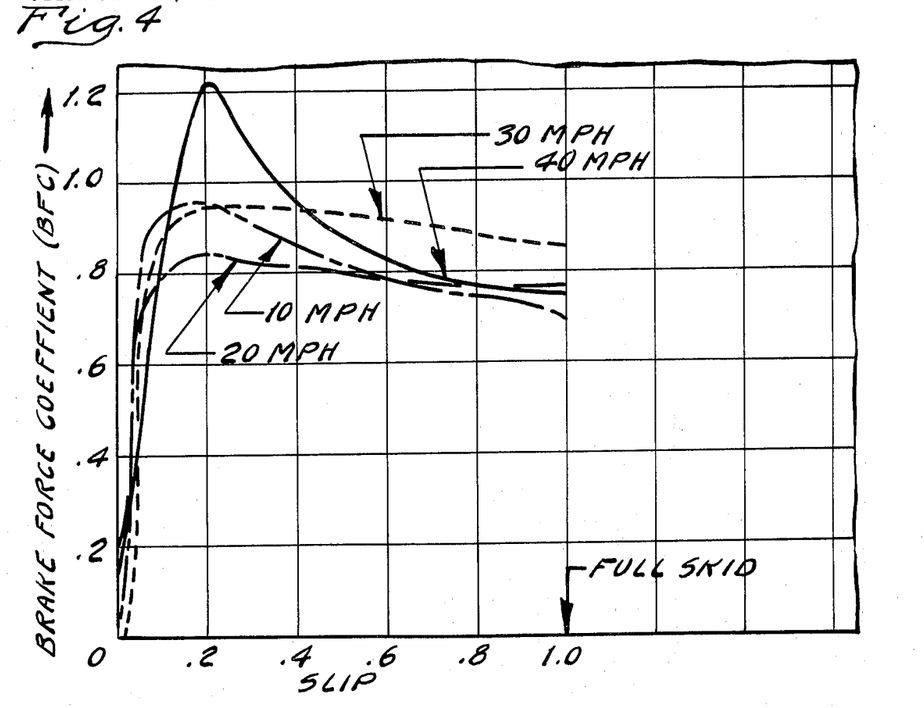
FIG. 4 is a plot showing the relationship between the brake friction coefficient of a vehicle tire acting on a typical road surface for various degrees of wheel slip.

The actual optimum brake force coefficient can be obtained experimentally. One set of data is illustrated in FIG. 4 where the percentage slip is plotted against brake force coefficient for various road speeds. In the particular instance involved here, the maximum brake force coefficient occurs at a higher wheel slip when the vehicle speed is higher. For example, at 40 miles per hour the maximum coefficient occurs at about 20% wheel slip.

Figure 2:
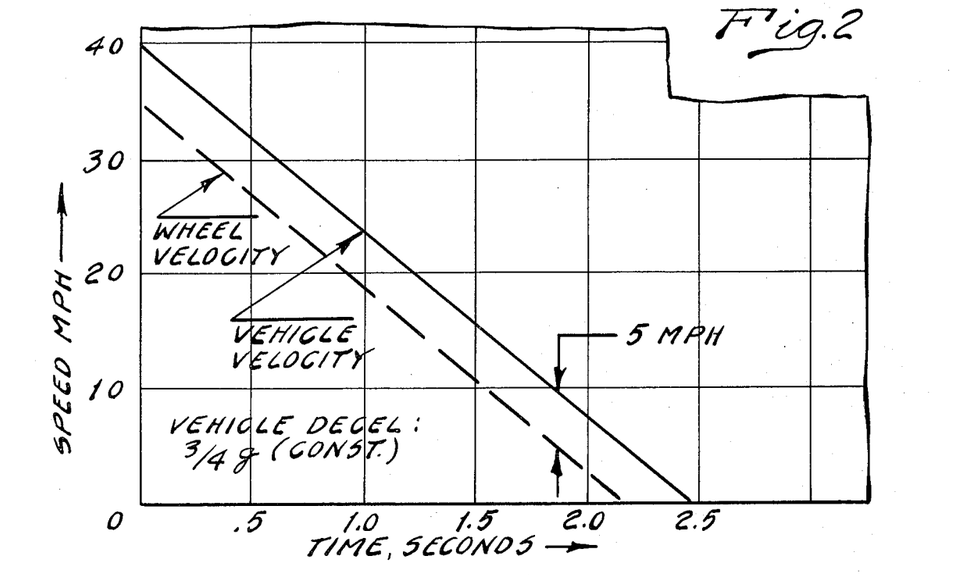
FIG. 2 is a chart showing the relationship between vehicle speed and braking time for a typical vehicle wheel brake system controlled by the mechanism shown in FIG. 1.

If we assume that the optimum wheel slipping corresponds to a vehicle speed difference of five miles per hour, and if we assume that the vehicle deceleration is ¾ g throughout the braking mode, the relationship between vehicle speed and time of braking is illustrated in FIG. 2.

Figure 3:
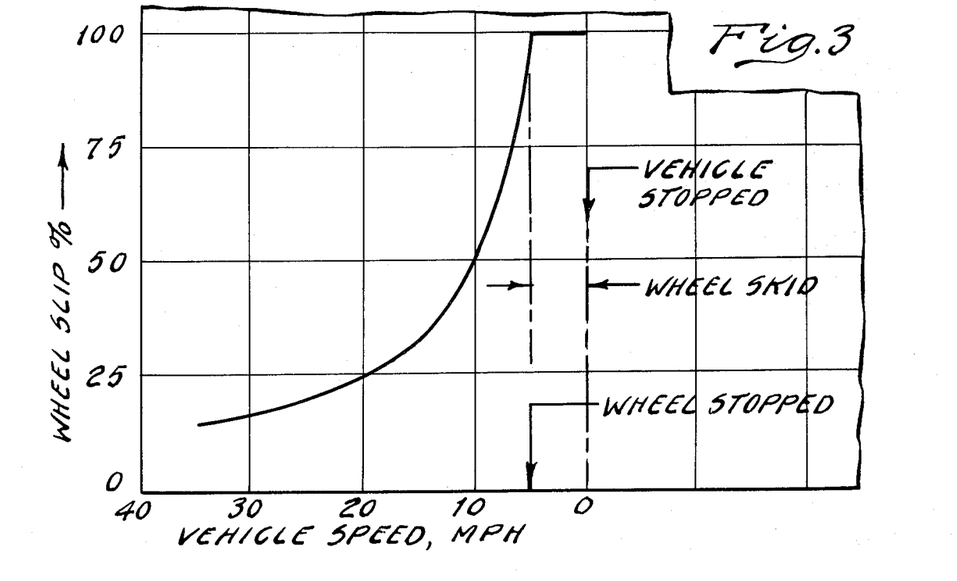
FIG. 3 is a plot of wheel slip measured in percent of wheel velocity versus the vehicle speed measured in miles per hour.

Using the plot of FIG. 2, the percent wheel slippage versus miles per hour of the vehicle can be illustrated as shown in FIG. 3.

Figure 5:
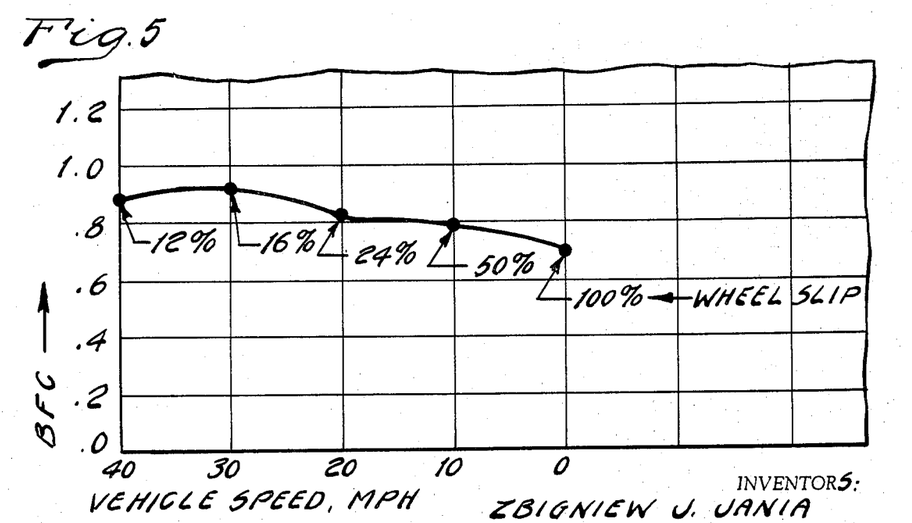
FIG. 5 shows a plot of the brake friction coefficient for various vehicle speeds. This is a composite chart showing the data of FIGS. 3 and 4.

If the control system operates as it is intended to do with the predetermined optimum wheel slip occurring throughout the braking cycle, a maximum brake force coefficient for all vehicle speeds from the maximum to the minimum speed can be achieved as indicated in FIG. 5. This data of FIG. 5 is computed from the information of FIGS. 3 and 4.

$V_C$ at point 92 serves as a base-emitter voltage signal for transistor 94. A forward bias base-emitter voltage normally will induce a collector current in a transistor such as the NPN transistor shown at 94, but this will not occur until a minimum base-emitter voltage is developed. When a wheel slip in the amount of 5 m.p.h. is achieved, the minimum threshold base-emitter voltage at point 92 is achieved. If the wheels tend to slip at a greater value, the comparator will induce a higher output voltage $V_C$. This in turn will trigger the operation of the transistor 94, thus causing a collector current to flow from supply line 96 and through resistor 98, the latter being connected to the input side of the collector for transistor 94. A stabilizing diode 100 may be used in the collector current if additional circuit parameters for controlling purposes are desired.

A second NPN transistor 102 is arranged in juxtaposition with respect to the transistor 94. The collector for the transistor 102 is connected to the supply source 96 which is common to the transistor 94. The collector circuit for the transistor 102 includes resistor 104, which is a counterpart for resistor 98. The emitters for each of the transistors 94 and 102 are connected to the ground side of the circuit through common resistor 110.

Voltage $V_P$ is the output voltage of a position feedback loop circuit which will be described subsequently. This voltage appears at point 106 on the high voltage side of resistor 108. The voltage drop across resistor 198 acts as a forward bias base-emitter voltage for the transistor 102, thereby inducing normally a collector current which flows from the supply 96, through the resistor 104 and finally through the resistor 110.

NPN transistor 112 is arranged between the transistors 94 and 102 with the base thereof connected to the collector side of the transistor 102 and to the low voltage side of the resistor 104. The emitter for the transistor 112 is connected to the output or low voltage side of the resistor 98. Whenever normal steady-state conditions exist, current will now flow through resistor 98. When the magnitude of the signal voltage at point 92 is sufficiently great to reflect wheel slippage in excess of 5 m.p.h., transistor 94 will conduct current. This induces a base-emitter voltage bias across transistor 112 because of the potential drop across resistor 98, thereby causing collector current to flow through line 114.

Upon an increase in the flow of collector current through transistor 94, the potential drop across resistor 110 will increase, thereby decreasing or cancelling the base-emitter voltage bias for transistor 102. This in turn results in a decrease or an interruption in the flow of collector current through resistor 104, and the voltage on the base of transistor 112, as measured from the point 116, will increase, thereby further augmenting the capacity of the transistor 112 to conduct current.

As soon as current begins to flow in line 114, a potential drop occurs across resistor 118, thereby creating a base-emitter voltage bias for transistor 120. This transistor forms a part of a trigger circuit which includes also a companion transistor 122. The initiation of a bias voltage on transistor 120 creates a collector current flow through resistor 124, through transistor 120 and through line 126, the latter being connected to one side of a control solenoid 128. The other side of the solenoid 128 is grounded to the common ground for the control circuit.

Prior to the instant at which the transistor 102 begins to conduct current, current is flowing through the transistor 122 by reason of the potential difference between the collector side of the transistor 122 and the input side of the solenoid 128. This results in curent flow through the transistor and through line 130 to the ground, a suitable control resistance 132 being provided as shown. As soon as the trigger circuit is actuated, the collector current for transistor 120 causes a reverse bias on the base for transistor 122 which causes the latter to stop conducting.

The solenoid 128 is illustrated schematically in FIG. 1C. The armature for the solenoid is connected to a valve spool 132, which is situated slidably in valve chamber 134. Spool 132 includes spaced valve lands 136 and 138. A spring 140 tends normally to bias the valve spool 132 in a right-hand direction as viewed in FIG. 1C. Valve ports, which are indicated by diagonal ends, represent exhaust ports.

Fluid pressure from control pump 142 is distributed through control pressure passage 144 to the valve chamber 134 at a location directly adjacent land 138. Pressure passage 146 communicates with the chamber 134 at a location adjacent land 136.

During steady-state operation and during braking of the vehicle with no skidding, solenoid 128 is deactivated and the valve spool 132 assumes the position shown in FIG. 1C. At that time passage 144 and passage 146 are brought into fluid communication. If skidding occurs and the value of the voltage $V_C$ is great enough to trigger the circuit and to energize solenoid 128, valve spool 132 shifts to the left, thereby exhausting passage 146 and interrupting communication between passages 146 and 144.

Passage 146 extends to a fluid pressure actuator 148 which comprises a cylinder 150 and a piston 152 slidably situated in the cylinder 150. A stem 154 is carried by the piston 152. It is slidably situated in an opening in wall 156. Piston 152 is urged in a right-hand direction, as viewed in FIG. 1C, by valve spring 158.

Piston 152 is connected directly to a small piston 160 which is slidably positioned in a reduced diameter cylinder 162. The right-hand end of cylinder 162 communicates with the valve chamber 164 in which is positioned a ball check valve 166. An extension 168 on the piston 160 is adapted to engage the ball check valve element 166 and moves off its seat against the opposing force of the valve spring, thereby establishing fluid communication between passages 170 and 172. Passage 170 extends from the master wheel brake cylinder for the vehicle wheel brakes, and passage 172 extends to the individual wheel brake cylinders at each of the vehicle wheels. A second pressure passage 174 extends from the right-hand side of the piston 152 to valve chamber 176 within which is slidably positioned valve spool 178.

Valve lands 180 and 182 are formed on the valve spool 178. These register with internal valve lands formed in the chamber 176. Passage 174 normally is exhausted through exhaust port 184 when the valve spool 178 assumes the position shown in FIG. 1C. It assumes that position during steady-state operation and during braking with no vehicle wheels skidding. When the valve spool 178 is shifted in a left-hand direction, fluid communication is established between passage 144 and passage 174. Movement of the valve spool 178 in a left-hand direction is controlled by a solenoid 186. When the solenoid 186 is energized, passage 174 becomes pressurized. When solenoid 186 is deactivated, valve spring 188 returns the valve spool 178 to the position shown in FIG. 1C.

If passage 174 is pressurized, the piston 152 tends to move in a left-hand direction. As it moves, the check valve 166 is allowed to seat against its valve seat, thereby interrupting fluid communication between passage 170 and the wheel brakes. At the same time the fluid pressure in passage 172 is decreased as the volume occupied by fluid increases due to the shifting movement of the piston 160.

Stem 154 is connected to a transducer core 190 which is formed of magnetic material. A position transducer coil 192 surrounds the core 190. The inductance in the transducer coil 192 can be varied as the position of the core 190 is changed. The position of the core 190 in turn depends upon the position of the piston 152 and the piston 160. The desired functional relationship between the change in the inductance and the transducer coil with respect to the position of the pistons can be varied by appropriately designing the shape of the core. In the particular embodiment shown in FIG. 1C. A substantially linear relationship exists by reason of the cone shape of the core.

Whenever the solenoid 128 is triggered, following an increase in the magnitude of the voltage signal $V_C$, the pressure chamber on the left-hand side of the piston 152 is exhausted. This does not result immediately in shifting movement of the piston 152 since the right-hand side of the piston also is exhausted through port 184. Spring 158 maintains the large piston 152 and the small piston 160 in the position shown and opposes the normal tendency of the wheel brake pressure acting on the right-hand end of the piston 160 to move the pistons 152 and 160 in a left-hand direction.

The pressure that normally exists on the left-hand side of the piston 152 assures that the pistons will not move during normal operation of the vehicle and during normal operation of the vehicle and during normal braking without skidding. When incipient skidding is detected, however, solenoid 128 is energized, as explained previously, and the left hand-side of the piston 152 is exhausted, thereby triggering the actuator for a subsequent wheel brake pressure modulation if the skidding tends to exceed the desired limiting value at which optimum braking torque is achieved. This controlling function is initiated as solenoid 186 becomes energized.

To trigger the operation of the solenoid 186, there is included in the system a second trigger circuit which comprises transistors 194 and 196. The input side for the second trigger circuit for solenoid 186 is connected to the common voltage supply line 96. A resistance, which may be in the form of a diode 198, is interposed between the emitter side of each transistor 194 and 196 so that the emitter voltage for the first trigger circuit for solenoid 128 will be slightly higher than the corresponding voltage for the trigger circuit for solenoid 186.

Prior to the triggering of the solenoid 186, current flows through transistor 196 and through the collector circuit which includes line 200. A control resistor 202 is located in the line 200. This current flow occurs because of the potential difference between the emitter and the base for transistor 196 prior to the triggering of the solenoid 186.

If the voltage signal $V_C$ should increase beyond the desired value corresponding to the predetermined wheel slip condition, the current flowing through line 114 and through resistor 118 will be increased because of the increased bias on transistor 112. This will result in a lower voltage at point 204 on the output side of resistor 206. The resistor 118 associated with the trigger circuit for a solenoid 128 is purposely designed with a lower resistance than the resistance 206 associated with the trigger circuit for solenoid 186. After the voltage at point 204 reaches a value low enough that is, the base-emitter bias for transistor 194 will be sufficient to cause collector current to flow through line 208, thereby increasing the potential drop across control resistor 210. This will decrease the bias across transistor 196, thereby causing it to stop conducting as the voltage on the input side of the solenoid 186 is increased. The solenoid 186, being energized in this way, causes the right-hand side of the piston 152 to be pressurized, as explained previously, thereby causing movement of the smaller piston 160 and tending to enlarge the volume occupied by the wheel brake fluid.

A position feedback loop, which includes the transducer coil 192, is connected between the ground side of the circuit and the supply line 96. A "breakdown" diode 212 is situated in line 214 extending between line 96 and the ground side of the circuit. A control resistor 216 is arranged in series with the diode 212. Diode 212 is designed so that the voltage potential across it is always greater than the so-called "avalanche" breakdown point. Thus the magnitude of the current flowing through the diode is sufficient to cause a relatively constant voltage at point 218.

A junction-field-effect transistor 220 is connected between point 218 and the transducer coil 192. The drain side of the transistor 220 is connected to point 218 through resistor 222, and the sink side of the transistor 220 is connected to the center terminal of the coil 192. The gate side of the transistor 220 is connected to the input side of the coil 192 and to one side of the capacitor 224. Diode 226 forms a rectifier for the oscillator subcircuit.

The transistor coil 192 and the condenser 224 are tuned so that voltage impulses occur on the gate of the transistor 220. This results in rectified voltage pulses at point 228 which are stabilized by a control capacitor 230. The voltage at point 228 is the same voltage $V_P$ appearing at point 106. The magnitude of the peak voltages established by the oscillator circuit a point 228, of course, is determined by the inductance of the coil 192. Thus the voltage $V_P$ is a function of the displacement of the piston 152.

As the piston 152 and the little piston 160 move to the left, the average value of the voltage $V_P$ at point 106 is decreased. If it is assumed that the wheel slippage is sufficiently great to cause solenoid 186 to become triggered, piston 160 will move in a left-hand direction, thereby tending to close the valve element 166 and expand the space occupied by the wheel brake fluid. But before the valve 166 is fully closed and before the piston 160 moves to its limiting position, which will completely deactivate the wheel brakes, the position transducer coil, by reason of the adjusted position of the transducer core, causes a reduced voltage $V_P$ to occur. This reduction in voltage occurs substantially in advance of the completion of the response by the actuator. An increase in voltage $V_P$ will tend to restore a balance across the differential amplifier which comprises transistors 94 and 102, thereby decreasing the flow of collector current in transistor 112. This deactivates the trigger circuit for solenoid 186 and immediately causes valve spool 178 to return to the position shown in FIG. 1C as the right-hand side of the piston 152 becomes exhausted.

The piston 152 begins to return to its original position before the valve 166 becomes fully closed. This again changes the inductance of the coil 192, thereby tending to reduce the peak voltages in the oscillator subscript which results in a reduced average voltage $V_P$ at point 106. The valve 178 thus opens and closes rapidly to cause the actuator piston 152 to assume a so-called average position although it is allowed to oscillate with a small amplitude about that average position. The amplitude of the oscillator is a function of the hysteresis of the trigger circuit for the solenoid 186. The frequency of the oscillations is comparable to the frequency at which the vehicle operator would operate the brake pedal with a pumping action to effect braking on slippery road surfaces. This pumping action occurs whenever the wheel slip tends to exceed the desired value.

When a steady state or non-slipping condition again is restored, the voltage $V_P$ falls to a value sufficient to cause the trigger circuit for the solenoid 128, to de-energize the solenoid 128, thereby again pressurizing the left-hand side of the piston 152. This quickly returns the piston to its original position and holds it fast as normal braking functions are restored. The master brake cylinder then is connected to the wheel brake cylinders in the usual fashion.

The shape of the core 190 can be determined experimentally. It establishes the relationship between the position of the actuator, the braking torque and the error signal $V_C$.

A similar system can be used to control skidding on each of the four wheels of the vehicle rather than only the two rear wheels in a rear wheel drive vehicle. In the case of a four-wheel control of a rear wheel drive vehicle, each front wheel is provided with a wheel speed pickup, a preamplifier, a frequency to voltage converter, and a comparator so that the velocity of either front wheel can be compared with the so-called synthesized vehicle velocity $V_S$. The output voltages for the front wheel comparators may be fed through a diode gate to a common point to generate an error signal which may be applied to a controller similar to that described with reference to FIG. 1.

Having thus described a preferred form of our invention, what we claim and desire to secure by U.S. Letters Patent is:

1. In a fluid pressure operated wheel brake system for a wheeled vehicle having individual wheel brakes and a master brake cylinder, an antiskid brake control system comprising an actuator having a pressure movable member, a modulator element connected to said member and situated in fluid communication with said wheel brakes, valve means for controlling distribution of pressure to said actuator whereby said movable member is actuated to effect modification of the pressure in said wheel brakes relative to the pressure in said master cylinder, a wheel speed signal generator, vehicle speed sensing means for producing a vehicle speed signal, means for comparing the wheel speed signal and the vehicle speed signal to produce a resultant signal that is an indicator of wheel slip, an actuator servo for said valve means, an energy source for said servo, circuitry connecting said energy source to said servo including control elements sensitive to said wheel slip signal for establishing operation of said servo in response to an increase in the magnitude of said wheel slip signal beyond a precalibrated value whereby said actuator is moved, and a feedback circuit including a position transducer actuated by said movable member for neutralizing the wheel slip signal in response to adjustment of said valve means, said wheel speed signal generator comprising a capacitor charged storage memory, speed pickup means for producing a voltage proportional in magnitude to wheel speed, said storage memory being connected to said pickup means, a switch operable upon application of said brakes to disconnect said pickup means from said storage memory the instant a vehicle braking mode is initiated, said vehicle speed sensing means comprising an inertial voltage signal source, an integrator circuit arranged in series with said inertial voltage signal source and activated at the beginning of the braking mode whereby a vehicle speed signal is synthesized at any instant during the brake mode, and a comparator for adding algebraically the magnitudes of the memorized voltage signal of said storage memory and the synthesized voltage signal.

2. The combination as set forth in claim 1 wherein said servo comprises a valve actuator solenoid, the energy source for said solenoid comprising a voltage supply, a differential amplifier circuit having two input elements and an output element, the wheel slip signal obtained by comparison of said memorized voltage signal with said synthesized voltage signal being applied to one input side of said differential amplifier, a position feedback circuit having an output portion connected to the other input side of said differential amplifier, said feedback circuit comprising a position transducer means connected to said movable member whereby the output voltage of said feedback circuit applied to said other input side of said differential amplifier is related to the position of said movable member, and circuitry connecting the output side of said differential amplifier to said solenoid whereby said solenoid is activated as a result of an unbalance between the wheel slip signal and the feedback signal.

3. The combination as set forth in claim 2 wherein the connection between said solenoid and said energy source includes an electronic trigger circuit, the output side of said differential amplifier being connected to said trigger circuit whereby the former induces on the latter a control bias, said trigger circuit, when the control bias exceeds a predetermined value, distributing to said solenoid an energizing current causing said valve means to respond thereby controlling the position of said movable member and immediately inducing the correcting voltage feedback through said feedback circuit tending to restore the voltage balance across said differential amplifier.

4. The combination as set forth in claim 3 wherein said feedback circuit comprises an oscillating subcircuit having an inductance and a capacitance in resonant relationship, said inductance forming a part of said position transducer and including an inductance coil, a transducer core connected to said movable member and adjustable with said movable member relative to said transducer coil thereby varying the inductance in said oscillatory circuit, the output of said oscillatory circuit being distributed to the other input side of said differential amplifier.

5. In a fluid pressure operated wheel brake system for a wheeled vehicle having individual wheel brakes and a master brake cylinder, an antiskid brake control system comprising an actuator having a pressure movable member, a modulator element connected to said member and situated in fluid communication with said wheel brakes, valve means for controlling distribution of pressure to said actuator whereby said movable member is actuated to effect modification of the pressure in said wheel brakes relative to the pressure in said master cylinder, a wheel speed signal generator, vehicle speed sensing means for producing a vehicle speed signal, means for comparing the wheel speed signal and the vehicle speed signal to produce a resultant signal that is an indicator of wheel slip, an actuator servo for said valve means, an energy source for said servo, circuitry connecting said energy source to said servo including control elements sensitive to said wheel slip signal for establishing operation of said servo in response to an increase in the magnitude of said wheel slip signal beyond a precalibrated value whereby said actuator is moved, and a feedback circuit including a position transducer actuated by said movable member for neutralizing the wheel slip signal in response to adjustment of said valve means, said wheel speed signal generator comprising a capacitor charged storage memory, speed pickup means for producing a voltage proportional in magnitude to wheel speed, said storage memory being connected to said pickup means, a switch operable upon application of said brakes to disconnect said pickup means from said storage memory the instant a vehicle braking mode is initiated, said vehicle speed sensing means comprising an inertial voltage signal source, an integrator circuit arranged in series with said inertial voltage signal source and activated at the beginning of the braking mode whereby a vehicle speed signal is synthesized at any instant during the braking mode, and a comparators for adding algebraically the magnitudes of the memorized voltage signal of said storage memory and the synthesized voltage signal, said wheel speed signal generator comprising a capacitor charged storage memory, speed pickup means for producing a voltage proportional in magnitude to wheel speed, said charge storage memory being connected to said pickup means, a switch operable upon application of said brakes to disconnect said pickup means from said storage memory the instant a vehicle braking mode is initiated, said vehicle speed sensing means comprising an inertial voltage signal source, an integrator circuit arranged in series with said inertial voltage signal source and activated at the beginning of the braking mode whereby a vehicle speed signal is synthesized at any instant during the braking mode, and a comparator for adding algebraically the magnitudes of the memorized voltage signal of said storage memory and the synthesized voltage signal.

6. The combination as set forth in claim 5 wherein said servo comprises a valve actuator solenoid, the energy source for said solenoid comprising a voltage supply, a differential amplifier circuit having two input elements and an output element, the wheel slip signal obtained by comparison of said memorized voltage signal with said synthesized voltage signal being applied to one input side of said differential amplifier, a position feedback circuit having an output portion connected to the other input side of said differential amplifier, said feedback circuit comprising a position transducer means connected to said movable member whereby the output voltage of said feedback circuit applied to said other input side of said differential amplifier is related to the position of said movable member, and circuitry connecting the output side of said differential amplifier to said solenoid, whereby said solenoid is activated as a result of an unbalance between the wheel slip signal and the feedback signal.

7. The combination as set forth in claim 6 wherein the connection between said solenoid and said energy source includes an electronic trigger circuit, the output side of said differential amplifier being connected to said trigger circuit whereby the former induces on the latter a control bias, said trigger circuit, when the control bias exceeds a predetermined value, distributing to said solenoid an energizing current causing said valve means to respond thereby controlling the position of said movable member and immediately inducing a correcting voltage feedback through said feedback circuit tending to restore the voltage balance across said differential amplifier.

8. The combination as set forth in claim 7 wherein said feedback circuit comprises an oscillating subcircuit having an inductance and a capacitance in resonant relationship, said inductance forming a part of said position transducer and including an inductance coil, a transducer core connected to said movable member and adjustable with said movable member relative to said transducer coil thereby varying the inductance in said oscillatory circuit, the output of said oscillatory circuit being distributed to the other input side of said differential amplifier.

9. In a fluid pressure operated wheel brake system for a wheeled vehicle having individual wheel brakes and a master brake cylinder, an antiskid brake control system comprising an actuator having a pressure movable member, a modulator element connected to said member and situated in fluid communication with said wheel brakes, valve means for controlling distribution of pressure to said actuator whereby said movable member is actuated to effect modification of the pressure in said wheel brakes relative to the pressure in said master cylinder, a wheel speed signal generator, vehicle speed sensing means for producing a vehicle speed signal, means for comparing the wheel speed signal and the vehicle speed signal to produce a resultant signal that is an indicator of wheel slip, an actuator servo for said valve means, an energy source for said servo, circuitry connecting said energy source to said servo including control elements sensitive to said wheel slip signal for establishing operation of said servo in response to an increase in the magnitude of said wheel slip signal beyond a precalibrated value whereby said actuator is moved, and a feedback circuit including a position transducer actuated by said movable member for neutralizing the wheel slip signal in response to adjustment of said valve means, said wheel speed signal generator comprising a capacitor charged storage memory, speed pickup means for producing a voltage proportional in magnitude to wheel speed, said storage memory being connected to said pickup means, a switch operable upon application of said brakes to disconnect said pickup means from said storage memory the instant a vehicle braking mode is initiated, said vehicle speed sensing means comprising an inertial voltage signal source, an integrator circuit arranged in series with said inertial voltage signal source and activated at the beginning of the braking mode whereby a vehicle speed signal is synthesized at any instant during the braking mode, and a comparator for adding algebraically the magnitude of the memorized voltage signal of said storage memory and the synthesized voltage signal, said wheel speed signal generator comprising a capacitor charged storage memory, speed pickup means for producing a voltage proportional in magnitude to wheel speed, said charge storage memory being connected to said pickup means, a switch operable upon application of said brakes to disconnect said pickup means from said storage memory the instant a vehicle braking mode is initiated, said vehicle speed sensing means comprising an inertial voltage signal source, an integrator circuit arranged in series with said inertial voltage signal source and activated at the beginning of the braking mode whereby a vehicle speed signal is synthesized at any instant during the braking mode, and a comparator for adding algebraically the magnitudes of the memorized voltage signal of said storage memory and the synthesized voltage signal, said wheel speed signal generator comprising a capacitor charged storage memory, a generator means for producing a voltage proportional in magnitude to wheel speed, said charge storage memory being connected to said pickup means, a switch operable upon application of said brakes to disconnect said pickup means from said storage memory the instant a vehicle braking mode is initiated, said vehicle speed sensing means comprising an inertial voltage signal source, an integrator circuit arranged in series with said inertial voltage signal source and activated at the beginning of the braking mode whereby a vehicle speed signal is synthesized at any instant during the braking mode, and a comparator for adding algebraically the magnitudes of the memorized voltage signal of said storage memory and the synthesized voltage signal.

10. The combination as set forth in claim 9 wherein said servo comprises a valve actuator solenoid, the energy source for said solenoid comprising a voltage supply, a differential amplifier circuit having two input elements and an output element, the wheel slip signal obtained by comparison of said memorized voltage signal with said synthesized voltage signal being applied to one input side of said differential amplifier, a position feedback circuit having an output portion connected to the other input side of said differential amplifier, said feedback circuit comprising a position transducer means connected to said movable member whereby the output voltage of said feedback circuit applied to said other input side of said differential amplifier is related to the position of said movable member, and circuitry connecting the output side of said differential amplifier to said solenoid, whereby said solenoid is activated as a result of an unbalance between the wheel slip signal and the feedback signal.

11. The combination as set forth in claim 10 wherein the connection between said solenoid and said energy source includes an electronic trigger circuit, the output side of said differential amplifier being connected to said trigger circuit whereby the former induces on the latter a control bias, said trigger circuit, when the control bias exceeds a predetermined value, distributing to said solenoid an energizing current causing said valve means to respond thereby controlling the position of said movable member and immediately inducing a correcting voltage feedback through said feedback circuit tending to restore the voltage balance across said differential amplifier.

12. The combination as set forth in claim 11 wherein said feedback circuit comprises an oscillating subcircuit having an inductance and a capacitance in resonant relationship, said inductance forming a part of said position transducer and including an inductance coil, a transducer core connected to said movable member and adjustable with said movable member relative to said transducer coil thereby varying the inductance in said oscillatory circuit, the output of said oscillatory circuit being distributed to the other input side of said differential amplifier.

References Cited
UNITED STATES PATENTS

| | | | |
|---|---|---|---|
| 3,498,682 | 3/1970 | Mueller et al. | 303—21 BE |
| 3,480,336 | 11/1969 | Clark et al. | 303—21 F |
| 3,394,967 | 7/1968 | Lucien | 303—21 BE |
| 3,401,984 | 9/1968 | Williams et al. | 303—21 BE |
| 3,467,443 | 9/1969 | Okamoto et al. | 303—21 BE |
| 3,586,387 | 6/1971 | Riordan et al. | 303—21 B |
| 3,477,346 | 11/1969 | Slavin et al. | 91—361 |
| 3,485,316 | 12/1969 | Slavin et al. | 180—105 R |

MILTON BUCHLER, Primary Examiner

S. G. KUNIN, Assistant Examiner

U.S. Cl. X.R.

188—181 C; 303—20